Dec. 14, 1965　　　G. A. KLOEHN　　　3,223,282
PRECISION MEASURING SYRINGE
Filed March 9, 1964
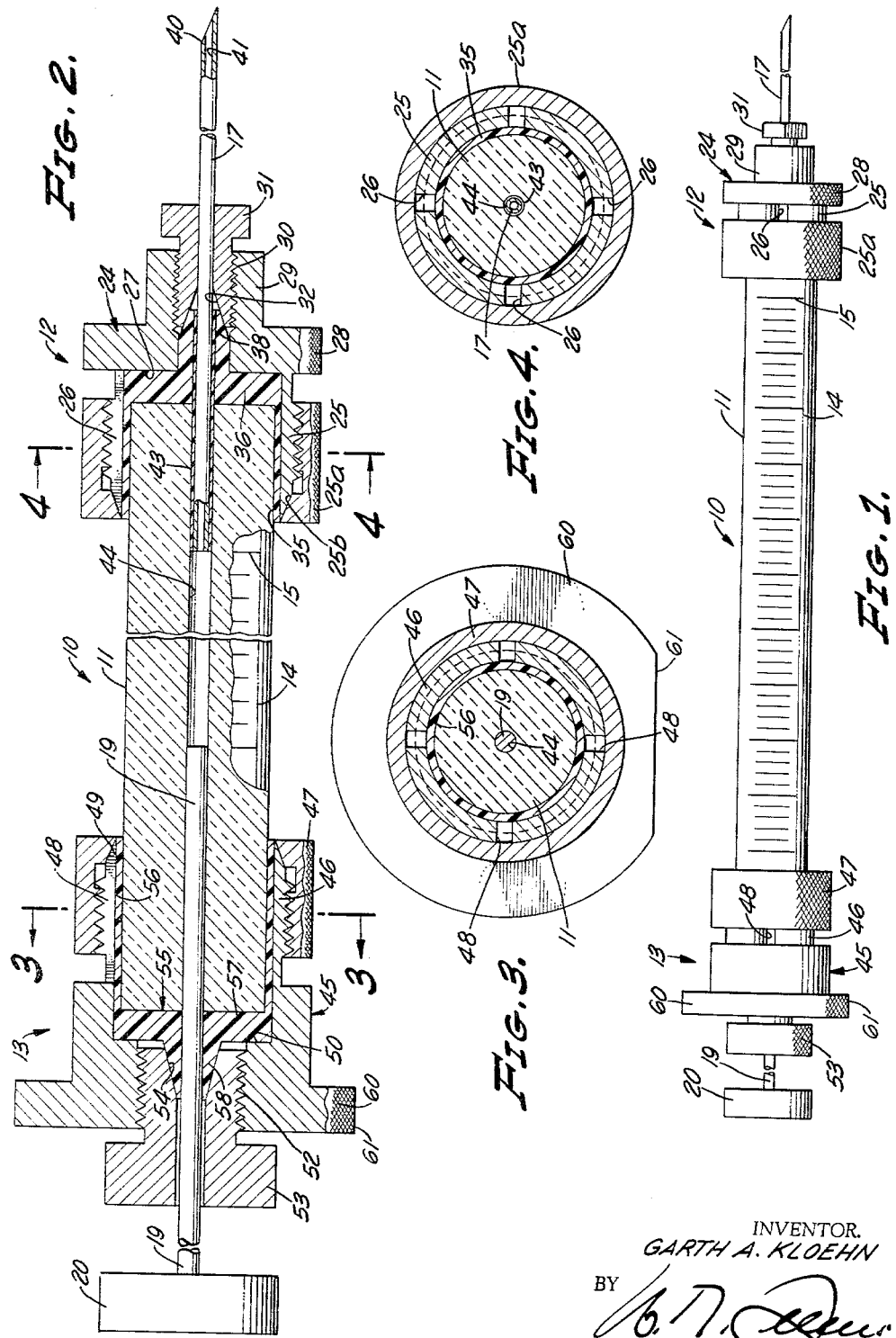
INVENTOR.
GARTH A. KLOEHN
BY
ATTORNEY

3,223,282
PRECISION MEASURING SYRINGE
Garth A. Kloehn, 2330 El Rancho Drive, Whittier, Calif.
Filed Mar. 9, 1964, Ser. No. 350,165
13 Claims. (Cl. 222—41)

This invention relates to syringes and more particularly to a high-precision high-accuracy technician's measuring syringe and embodying various unique features increasing the efficiency, effectiveness, reliability and overall utility while substantially reducing the cost of the syringe.

Precision measuring syringes in common used by laboratory technicians, research personnel and professional people have a wide variety of applications characterized by the need for dispensing precisely measured minute quantities of a fluid with high reliability and often against pressures in excess of 100 to 150 p.s.i. Syringes capable of meeting these requirements as heretofore proposed must be manufactured to high tolerance specifications and are very costly. Moreover the rejection of individual components for failure to meet specifications has been very high and correspondingly costly. Syringe barrels are customarily made of high-strength thick-walled glass manufactured to exacting specifications and having a very accurately finished bore seating an equally high precision plunger so closely as to provide a fluid tight seal even under high pressure operating conditions. The slightest imperfection or variation from specification values in the barrel bore or in the plunger necessitating their rejection when using prior manufacturing procedures whereas both parts are usually quite as acceptable as others without sacrificing accuracy or other desirable characteristics of the syringe of this invention. Furthermore, it is found that prior syringe constructions are likely to have a short service life because of the ease with which a minute particle of foreign matter attached to the plunger when in extended position may enter the bore and damage the surfaces and cause jamming or erratic action of the plunger all of which are intolerable in a precision laboratory implement.

Another serious disadvantage of prior measuring syringe constructions is in the lack of satisfactory means for detachably coupling the needle to the discharge end of the barrel. Needles are subject to bending, damage, breaking, and dulling of the pointed end. These and other factors necessitate provision for detachably coupling the needle to the syringe. Coupling means as heretofore provided are subject to malfunctioning and do not provide adequate assurance against leakage or adversely and erratically affecting the volume of the charge chamber. In particular certain of the prior designs permit assembly of the needle to different distances within the syringe bore with the result that it is impossible to charge the syringe with an accurately known quantity of fluid owing to the variable portion of the discharge end of the bore occupied by the needle shank.

Other shortcomings of prior designs include use of transparent barrels of complex design costly to manufacture and the lack of simple, easily operated means for holding the plunger-supporting and the needle-clamping couplings assembled to the opposite ends of the barrel.

The foregoing and other serious shortcomings of prior precision measuring syringe constructions are avoided by the present invention which features a plain tubular barrel free of contouring. Detachably clamped, as by mechanical collet-type clamping means, to the opposite ends of this barrel are needle mounting and plunger-supporting subassemblies. Each of these very similar subassemblies includes a one-piece resilient packing member of generally cup shape having its side wall sandwiched between the collet shank and the syringe barrel and providing a fluidtight junction with the barrel. The bottoms of the two gaskets are held seated against the barrel ends and each includes a hollow conical projection adapted to form a fluidtight fit respectively with the plunger and with the needle shank. Complementally shaped clamping bushings seat over these conical bosses and are adjustable to compress these bosses into sealing engagement with the plunger and with the needle and to cooperate in holding the packing immovably seated against the adjacent end of the barrel.

A feature of the needle-mounting coupling is the provision on the needle shank of a filmy thin sealing sleeve and snugly fitting the barrel bore. Additionally, the needle is always so positioned in the bore that its inner end is precisely opposite the end of the zero graduation of the syringe scale thereby enabling the syringe to be charged with a precise quantity of fluid which is fully dispensed as the plunger bottoms out on the needle end acting as a positive plunger stop.

Still another feature of importance is the fact that the plunger, though finished to a uniform predetermined cross-section, does not have a sealing fit with the bore. Instead, the fluid seal is provided by the packing gland for the plunger which gland is so designed as to support the plunger firmly in the bore and in such manner that axial displacement of the plunger along the bore provides a highly reliable, precise method of determining changes in the bore volume. In other words the gasket seal remains positively clamped in position at the bore ends and cannot move to vary the bore capacity. Accordingly, the graduated scale provided along the barrel is accurately calibrated to represent the volumetric displacement of the plunger rather than the volumetric capacity of the bore itself.

It is therefore a primary object of the present invention to provide a high precision, high pressure measuring syringe of improved and unique design.

Another object of the invention is the provision of a precision measuring syringe featuring similar coupling assemblies detachably secured to the opposite ends of a tubular barrel and respectively clamping a plunger and a hollow needle in a fluidtight manner within the opposite ends of the barrel bore.

Another object of the invention is the provision of a precision measuring syringe employing a plunger having close but nonsealing engagement with the barrel bore and reciprocally supported in a fluidtight immovable gasket means at one end of the barrel.

Another object of the invention is the provision of an improved needle coupling assembly for a measuring syringe by which a simple needle can be detachably secured in a fluidtight manner to the discharge end of the barrel with its inner end accurately positioned relative to the syringe scale and effective as a plunger stop when a predetermined quantity of fluid has been discharged.

Another object of the invention is the provision of an improved precision measuring syringe having a minimum of precision surfaces and adapted to utilize replacement components.

These and other more specific objects will appear upon reading the following specification and claims and upon considering in connection therewith the attached drawing to which they relate.

Referring now to the drawing in which a preferred embodiment of the invention is illustrated.

FIGURE 1 is an overall view of a preferred embodiment of the syringe;

FIGURE 2 is a longitudinal sectional view on an enlarged scale with parts broken away for clarity; and FIGURES 3 and 4 are cross-sectional views taken respectively on lines 3—3 and 4—4 of FIGURE 2.

A preferred embodiment of the invention syringe illustrated in the drawing and designated generally 10 has a thick-walled tubular barrel of transparent glass or plastic material provided at its opposite ends with a needle-coupling assembly 12 and a plunger-mounting assembly 13. One side of barrel 11 has imprinted thereon an accurate scale 14 having its zero graduation 15 extending transversely of the plane of the inner end of needle 17. This scale is calibrated to correspond with the volumetric displacement of dispensing plunger 19 having a thumbpiece 20 at its outer end.

The structural details of coupling assemblies 12 and 13 are best shown in FIGURES 2 to 4 and these will be understood as resembling one another closely in structure and mode of operation.

Needle coupling assembly 12 includes a metal sleeve member 24 having a threaded collet shank 25 telescoped over the forward end of syringe barrel 11 and having a plurality of slots 26 extending therealong to permit contraction of the remainder of the collet shank toward barrel 11. The threaded collet shank 25 is surrounded by a cooperating collet sleeve 25a having a knurled exterior surface and a frusto-conical surface 25b engaging a similarly and complementally shaped surface at the end of shank 25. Consequently it will be recognized that tightening of sleeve 25a constricts the collet fingers inwardly to compress the thin side walls 35 of the gasket into firm clamping engagement with the exterior wall of barrel 11.

The midportion of sleeve 24 is provided with an inwardly extending shoulder 27 and an outwardly directed flange 28 the rim of which is preferably knurled for convenience in gripping the assembly. The forward reduced end 29 of sleeve 24 is threaded interiorly thereof at 30 to seat a clamping nut or bushing 31 having a conical recess 32 axially of its inner end for a purpose to be described presently.

Interposed within collet shank 25 is a one-piece cup-shaped packing member of resilient material such as Teflon or a suitable rubber compound having thin side walls 35 and a flat thick-walled bottom 36. This gasket seats snugly within the shank with its outer end face seating against shoulder 27 of sleeve 24 and the interior face of its bottom supported immovably directly against the end of barrel 11. Integral with and projecting forwardly from the exterior end face of the cup-shaped gasket is a hollow conical boss 38 complemental to conical recess 32 in the adjacent end of clamping nut 31.

Needle 17 has a sharp-pointed forward end 40 which may be tapered rearward of the bevel-cut point if desired and a fine passage 41 extending throughout the length thereof. The inner end of the needle shank is enclosed by a snug-fitting sleeve 43 of Teflon or the like having an exterior diameter snugly fitting the bore of boss 38 and bore 44 of syringe barrel 11. It will be understood that this sleeve is bonded or otherwise secured to the needle and that it has a snug press fit within the axial bore of the gasket and barrel bore 44. Alternatively, sleeve 43 may be an integral part of packing member 35, 36. The inner ends of the shank and the sleeve are square cut and the needle is inserted until this flat end is precisely opposite zero graduation 15 of scale 14. At the time of assembly nut 31 is in retracted position free of contact with conical boss 38. Once the needle has been accurately inserted and positioned clamping nut 31 is rotated to tighten it so that its conical recess 32 contracts conical boss 38 inwardly against Teflon sleeve 43 to provide a high pressure, leakproof seal and assembly clamp for the needle. It will be understood that needle 17 may be staked, soldered or otherwise secured to clamping nut 31.

Plunger mounting assembly 13 is generally similar to assembly 12 and includes a main body sleeve 45 having a threaded collet shank 46 supporting a knurled collet sleeve 47. Shank 46 is provided with slots 48 lengthwise thereof having the same functions as slots 26 in assembly 12, the conical surface 49 of sleeve 47 being effective to constrict the fingers of the collet shank inwardly as sleeve 47 is tightened. The outer end of sleeve 45 is provided with an inwardly extending shoulder 50 as well as with threads 52 seating an adjustable clamping nut 53 having a conical depression 54 at its inner end for a purpose to be described. The outer end of nut 53 has a knurled head by which the nut can be gripped and adjusted.

Snugly seated within the inner end of sleeve 45 is a cup-shaped gasket of Teflon or the like elastomeric material the thin side wall 56 of which has a snug sliding fit with the exterior of syringe barrel 11 and with the interior of collet shank 46. This thin side wall is compressed snugly and under high pressure against barrel 11 by tightening collet sleeve 47 as the thick-walled bottom 57 of the gasket is held pressed against the end of the barrel.

Projecting axially from the outer bottom surface of gasket 55 is a hollow conical boss 58 shaped complementally to recess 54 in clamping nut 53. Reciprocally supported in the bore passing through boss 58 is the syringe plunger 19 of suitable material as stainless steel spring wire, the bore through the gasket being accurately finished to have a very close fit with the plunger. A high pressure effective seal is thereby provided by the proper adjustment of bushing 53 so that its conical depression 54 constricts conical boss 58 and holds it sealed firmly against the plunger. The clamping nut also cooperates with boss 58 and with shoulder 50 of sleeve 45 in holding the bottom wall of the cup-shaped gasket 55 firmly and positively seated against the end of barrel 11.

It is pointed out and emphasized that the precision finished plunger has a slightly smaller cross-sectional area than that of syringe bore 44 and does not have a fluidtight seal with the bore. A clearance of ½ to 2 mils between the side of the plunger and the wall of bore 44 is quite satisfactory and avoids risk of damage to these surfaces should fine particles of foreign matter be carried past the sealing gasket and into the bore during depression of the plunger. Actually the sealing gasket is a highly effective wiper guard found to prevent entrance of foreign matter into the syringe bore under most conditions.

In view of the presence of slight clearance between the plunger and bore 44 it will be recognized that it is the volumetric displacement of the plunger itself rather than the capacity of the bore which controls measurement of the charge within the bore and the dispensing of a precise portion of this charge from the syringe. Accordingly, scale 14 is accurately calibrated to represent the volumetric displacement of the plunger and not the capacity of bore 44.

To safeguard against the described syringe rolling from a table top or the like when not in use, fingergrip flange 60 of the plunger coupling assembly is provided with one or more flat surfaces 61, as shown in FIGURE 3.

The assembly and mode of use of the described syringe will be quite apparent from the foregoing detailed construction of its components and their stuctural and functional relationship to one another. Needle-clamping coupling assembly 12 and plunger-supporting assembly 13 are readily secured to and removed from the opposite ends of the tubular syringe barrel by operation of their respective collet clamping units. Each includes a unitary resilient cup-shaped gasket held pressed against one of the barrel ends in a fluidtight manner by a backup wall of the rigid sleeve forming the main body of these assemblies. Each gasket includes an outwardly directed conical boss cooperating with an adjustable clamping nut for compressing the boss either against the syringe needle or the syringe plunger.

The simple needle structure includes a thin resilient sleeve having a close sliding fit with the syringe bore and arranged to be clamped rigidly in place with its inner flat end directly opposite the zero graduation of the calibrated scale. The needle end therefore acts as a positive stop for the plunger and cooperates therewith and with the bore in providing the charge chamber for the liquid or gas to be measured and dispensed from the needle under pressure.

In use the plunger is depressed until it stops against the inner end of needle 17. The bore of the syringe is then filled as the plunger is retracted using well known operating technique.

Any desired portion of the charge may be ejected by depressing the plunger after first noting the reading on the scale opposite the inner end of plunger 19 at the beginning of the dispensing stroke. It is also quite common to precharge the bore with the exact quantity of fluid intended to be ejected and to then depress the plunger until it abuts the end of the needle, it being then known that the exact desired charge has then been dispensed.

It is found that the described spill-proof syringe, readily repaired by the user, operates to discharge and measure precise amounts of either liquid or gaseous fluid discharged under pressures as high as 200 p.s.i. or even higher without risk of leakage about either the shank of the needle or the plunger.

While the particular precision measuring syringe herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A high-precision micro measuring syringe comprising a thick-walled transparent barrel with a bore of uniform cross-section therethrough and having a graduated scale extending lengthwise of its exterior, hollow needle means having a shank end fitting snugly and in a fluidtight manner in one end of said bore with its inner end terminating opposite a predetermined graduation line of said scale, means for releasably clamping said needle in assembled position in said barrel bore in a leakproof manner, and means reciprocably supporting a fluid dispensing plunger in the other end of said bore and operable as said plunger is depressed to dispense a precise quantity of fluid from said bore and through said hollow needle under pressure of at least several pounds per square inch.

2. A micro measuring syringe as defined in claim 1 characterized in that said hollow needle includes a thin layer of resilient material having a fluidtight fit with the exterior surface of the shank end thereof and with the juxtaposed surface of said barrel bore and serving as a sealing gasket therefor, and said clamping means being anchored to one end of said barrel and including manually adjustable gripping means for clamping said needle in assembled position and for compressing the outer end portion of said thin sleeve against the side of said needle shank.

3. A micro measuring syringe as defined in claim 2 characterized in that said needle-clamping means includes a generally cup-shaped unitary gasket member seated snugly over the needle-supporting end of said barrel and held thereto in a fluidtight manner, said gasket having a hollow tubular extension projecting axially from the exterior of its bottom and sized to have a close sliding fit with the sleeve on said needle shank, and said clamping means being operable to constrict said tubular extension into pressure sealing contact with said sleeve.

4. A high-precision syringe having a tubular transparent barrel of uniform cross-section throughout its length, first and second detachable coupling means at the opposite ends of said barrel for coupling a hollow needle and a reciprocable plunger to the respective ends of said barrel, each of said coupling means including a cup-shaped one-piece resilient gasket member telescoped snugly over the associated end of said barrel, adjustable collet means mounted about each of said gasket means and including separate bushing rings adjustable to compress the side walls of said gaskets against the underlying exterior surfaces of said barrel to clamp said gasket means firmly to said barrel in a fluidtight manner, and each of said gasket means having an axial bore therethrough for respectively seating reciprocable plunger means and a hollow needle therein with the inner end of said plunger means positioned in axial alignment with said barrel bore.

5. A high-precision measuring syringe having a tubular barrel with a small diameter precision bore of uniform cross-section provided with hollow needle-supporting means at one end, a charge-dispensing plunger reciprocably supported in the other end of said bore of uniform cross-section slightly smaller than said bore and free of sealing engagement therewith, and packing gland means supporting said plunger and including means for holding said gland means stationary with respect to the adjacent end of said barrel when under load and effective to prevent leakage of fluid therepast as said plunger is depressed to dispense a precise quantity of fluid from said bore through the discharge end thereof.

6. A measuring syringe as defined in claim 5 characterized in that said packing gland means includes a thick ring of resilient material closely embracing said plunger and positioned against the plunger-seating end of said barrel, said resilient ring including a conical projection centrally of its exterior side embracing said plunger, and axially adjustable means encircling said conical projection and shaped complementally to the outer surface thereof for varying the compressive pressure acting to constrict said projection into sealing engagement with said plunger and to hold said thick ring immovable axially of said barrel.

7. A high-precision measuring syringe for dispensing a precise quantity of fluid into a closed space against pressures in excess of 50 p.s.i., said syringe having a transparent thick-walled tubular barrel with a small diameter opening through the opposite ends thereof and including hollow needle-supporting means mounted on its discharge end, a plunger reciprocably supported in the other end of said barrel of uniform diameter throughout the portion thereof operating within said syringe and having a close sliding but nonsealing fit with the wall of said bore, coupling sleeve means secured to said other end of said barrel with a threaded end projecting axially beyond the barrel, thick gasket ring means having its inner face held immovably seated against the barrel end and having a hollow conical projection extending outwardly from its outer face and snugly embracing said plunger, and adjustable bushing means in threaded engagement with said threaded sleeve means and having its inner end shaped complementally to said conical projection and cooperating therewith to vary the sealing pressure against said plunger and to hold said gasket ring immovable with respect to said barrel irrespective of the pressure being applied to fluid therewithin by said plunger.

8. A plunger-mounting-and-sealing assembly for use in holding a precision plunger reciprocably assembled to one end of the barrel of a high-precision high-pressure measuring syringe, said assembly comprising a rigid sleeve having an annular shoulder on the interior thereof, one end of said sleeve being formed as a threaded collet shank, a collet bushing adjustable along said shank to compress the latter inwardly, a cup-shaped one-piece gasket of resilient material having a thin side wall seated against the inner surface of said collet shank and adapted to be clamped thereby with its bottom and side wall held immovably against the end and juxtaposed outer surface of syringe barrel, a long hollow conical boss projecting axially from the exterior side of the bottom of said cup-shaped gasket snugly embracing a syringe plunger mounted therein, the other end of said rigid sleeve being threaded and seating a threaded clamping nut therein, said bushing having a conical seat at its inner end seating against said conical projection and effective when rotated to adjust the sealing pressure between said gasket and the juxtaposed surfaces of said plunger.

9. A plunger-mounting-and-sealing assembly as defined in claim 8 characterized in that said rigid sleeve includes finger-grip means projecting radially from the outer side walls thereof and by which a user can support said assembly between two fingers while holding his thumb against the outer end of said plunger, said finger grip means being noncircular and effective to prevent said assembly from rotating through a full revolution about its own axis thereby to safeguard against the syringe rolling off a flat supporting surface on which it is placed when not in use.

10. A needle-mounting-and-sealing assembly for use in holding a syringe needle coupling detachably assembled to one end of the barrel of a high pressure measuring syringe, said assembly comprising a rigid interiorly stepped sleeve having a threaded collet shank at one end adapted to be telescoped over a syringe barrel, a collet sleeve threaded over said shank effective to constrict the latter into gripping relation to a syringe barrel, a one-piece cup-shaped resilient sealing gasket seated within said collet shank with the thin side wall thereof seated against the interior wall of said collet shank and adapted to telescope snugly over one end of a syringe barrel for clamping engagement therewith as the collet sleeve is tightened, a hollow conical boss projecting axially from the exterior bottom face of said gasket, and means for clamping a hollow syrnge needle in place axially of said assembly with said conical boss sealed against the exterior wall of the hollow needle and with the inner end of the needle projecting a predetermined distance beyond the interior face of said gasket bottom.

11. The assembly defined in claim 10 characterized in that the stepped portion of said rigid sleeve seats against the exterior face of the gasket bottom and is effective to hold the latter firmly and fixedly sandwiched against the end of a syringe barrel on which the assembly is held clamped by said collet sleeve and shank.

12. A plunger-mounting-and-sealing assembly for use in holding a syringe plunger coupling detachably assembled to one end of the barrel of a high pressure measuring syringe, said assembly comprising a rigid interiorily stepped sleeve having a threaded collet shank at one end adapted to be telescoped over a syringe barrel, a collet sleeve threaded over said shank effective to constrict the latter into gripping relation to a syringe barrel, a one-piece cup-shaped resilient sealing gasket seated within said collet shank with the thin side wall thereof seated against the interior wall of said collet shank and adapted to telescope snugly over one end of a syringe barrel for clamping engagement therewith as the collet sleeve is tightened, a hollow conical boss projecting axially from the exterior bottom face of said gasket, and means for clamping a fluid dispensing plunger in place axially of said assembly with said conical boss sealed against the exterior wall of the plunger and with the inner end of the plunger reciprocably supported within the syringe barrel.

13. The assembly defined in claim 12 characterized in that the stepped portion of said rigid sleeve seats against the exterior face of the gasket bottom and is effective to hold the latter firmly and fixedly sandwiched against the end of a syringe barrel on which the assembly is held clamped by said collet sleeve and shank.

References Cited by the Examiner
UNITED STATES PATENTS

| | | |
|---|---|---|
| 1,117,701 | 11/1914 | Platt et al. |
| 1,240,033 | 9/1917 | Dickinson. |
| 3,153,496 | 10/1964 | Johnson _____ 222—386 |

LOUIS J. DEMBO, *Primary Examiner.*